United States Patent [19]

Stewart

[11] 4,101,159
[45] Jul. 18, 1978

[54] VAN OVERHEAD CONSOLE

[76] Inventor: Buster D. Stewart, 16123 Runnymede St., Van Nuys, Calif. 91406

[21] Appl. No.: 814,863

[22] Filed: Jul. 12, 1977

[51] Int. Cl.² ............................................. B60R 7/04
[52] U.S. Cl. ............................... 296/37.7; 224/42.1 C
[58] Field of Search ................... 296/1 R, 37.7, 24 R; 224/42.1 R, 42.1 C, 42.1 D, 42.1 E; 206/19.5 R; 312/245, 246

[56] References Cited

U.S. PATENT DOCUMENTS

| | | | |
|---|---|---|---|
| 3,284,041 | 11/1966 | Tjaden | 224/42.1 C X |
| 3,773,378 | 11/1973 | Lewis | 296/37.7 X |
| 3,856,192 | 12/1974 | Nelson | 296/37.7 X |

Primary Examiner—Robert R. Song
Assistant Examiner—Gene A. Church

[57] ABSTRACT

A four-piece molded console to be mounted on the interior roof and rear corners of a van. The overhead portion is a two-piece rectangular shape with a matching piece at each side of the rear to fit the rear corners of the van. The console contains numerous compartments and cutouts in which are installation speakers, mirrors, electronic equipment and controls, a clock, vents, lights and at least one openable window.

7 Claims, 10 Drawing Figures

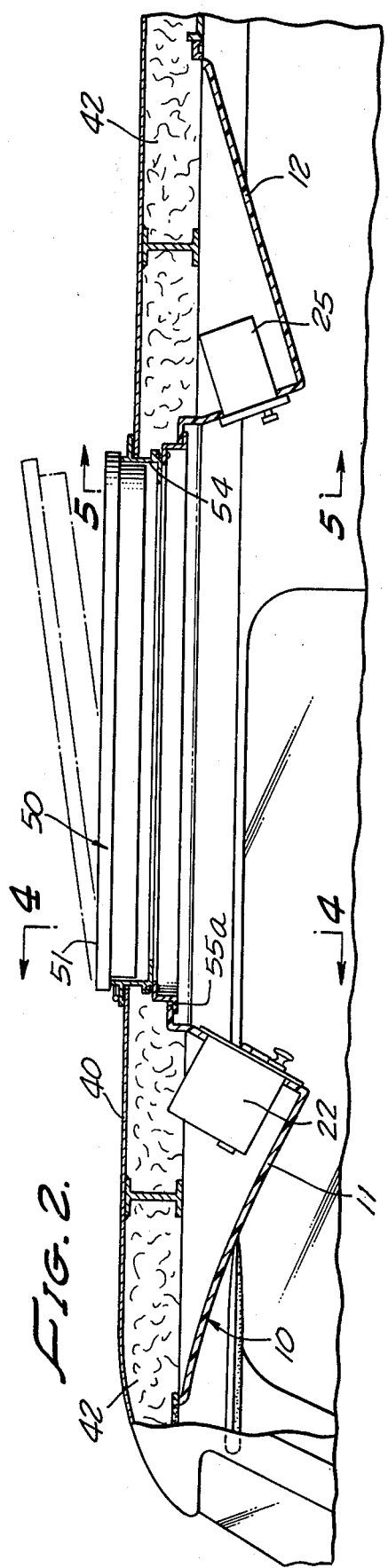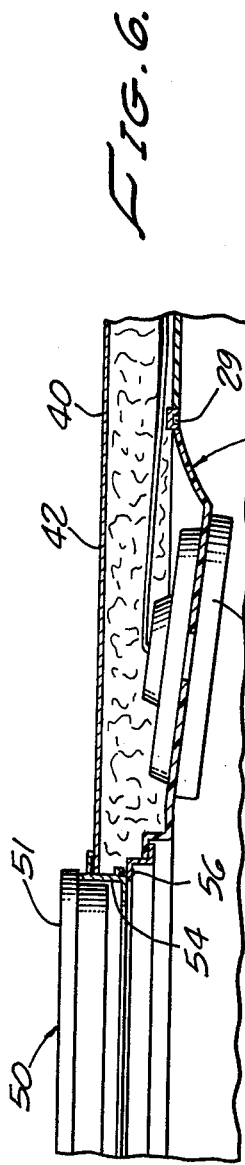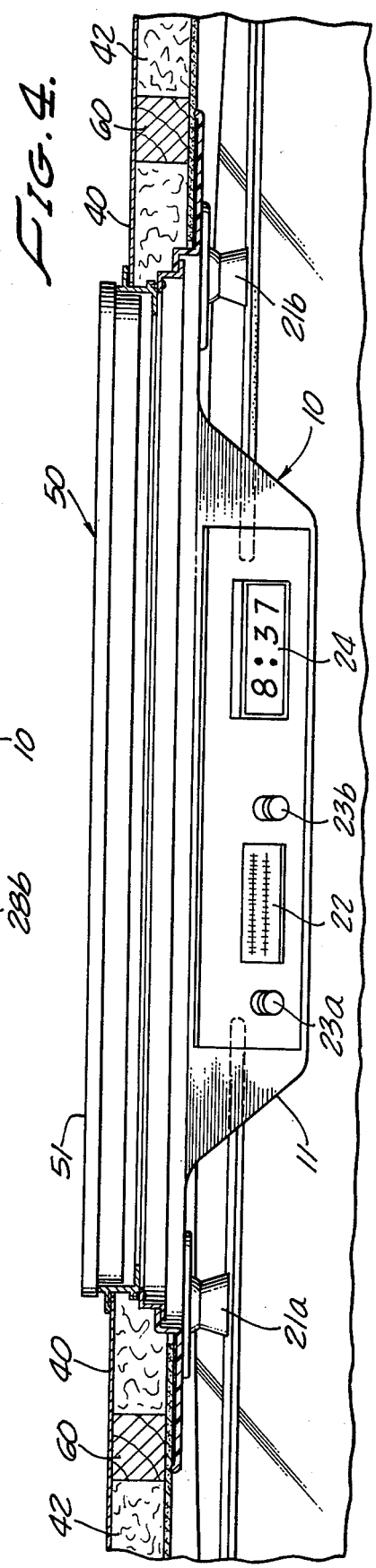

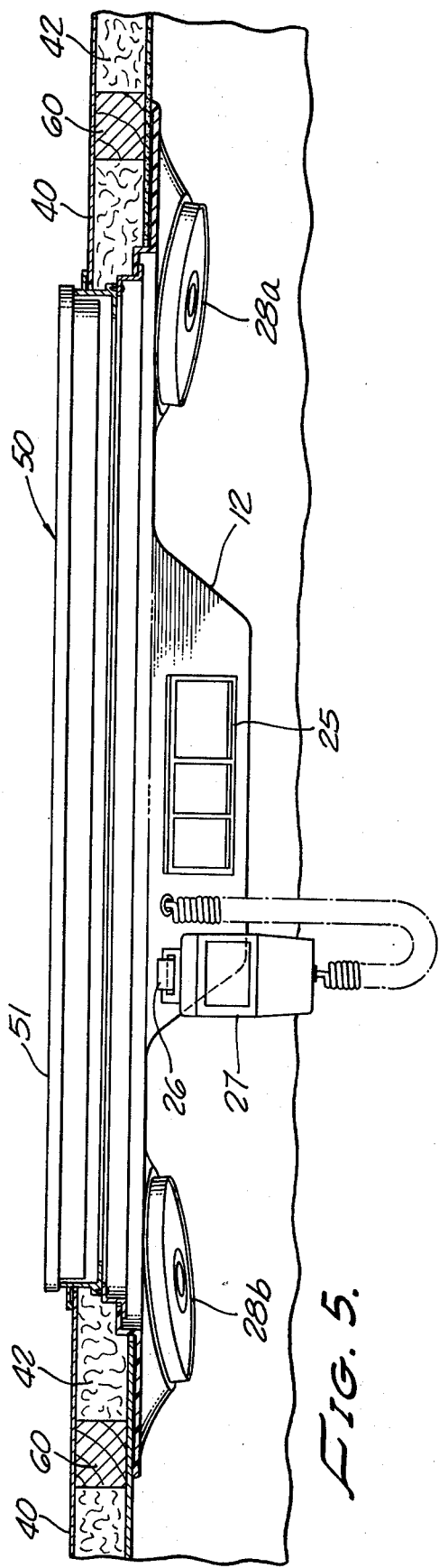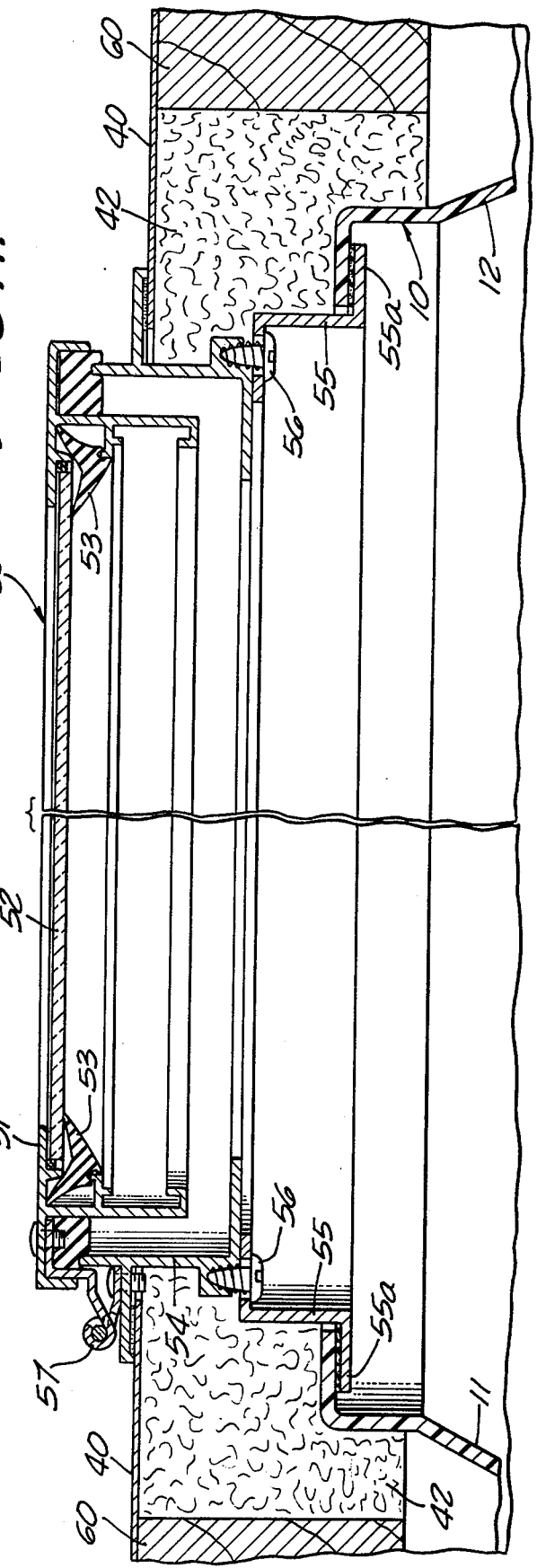

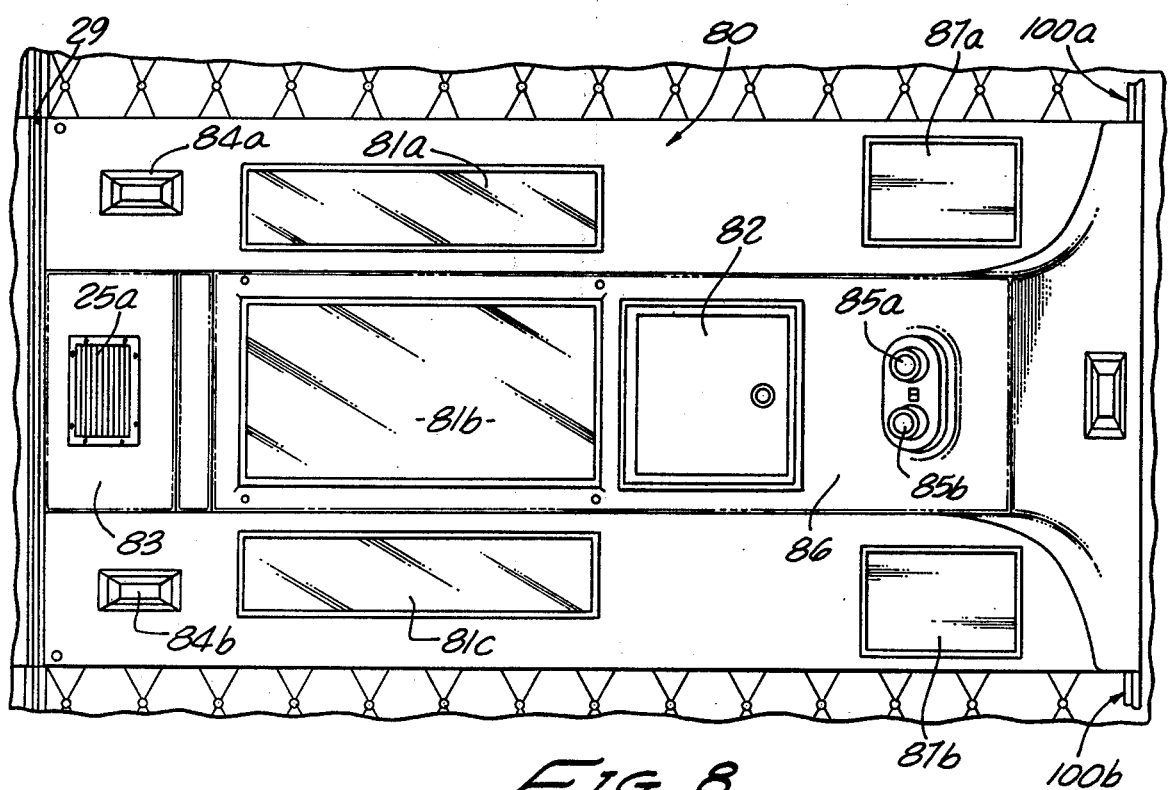
FIG. 8.
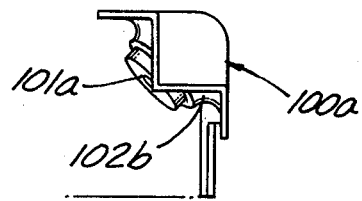
FIG. 9.
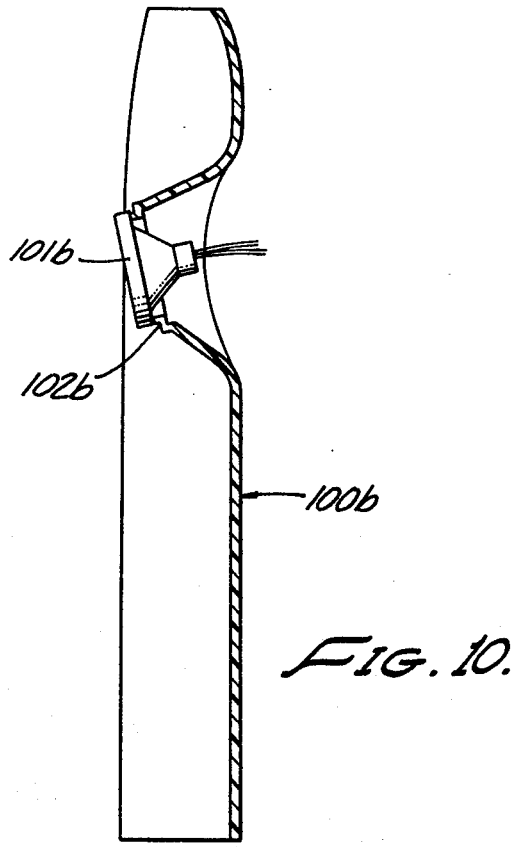
FIG. 10.
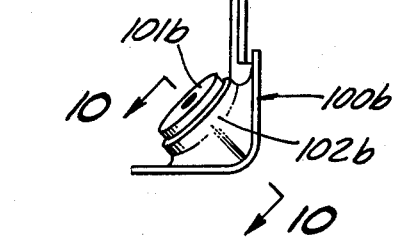

VAN OVERHEAD CONSOLE

BACKGROUND OF THE INVENTION

1. Field of the Invention

This invention relates to molded van consoles and is primarily concerned with interior overhead van consoles with matching rear corner portions.

2. Description of the Prior Art

At the present time vehicles are being provided with various types of interior carriers or racks for storage and installation of auxiliary accessories and equipment.

U.S. Pat. No. 3,773,378 illustrates an overhead console with two compartments. One compartment is designed for deposit of a tape player or radio, the other for storage of small articles.

U.S. Pat. No. 3,856,192 discloses an interiorally mounted stereo tape storage rack mounted at an angle above the upper front window of the vehicle.

U.S. Pat. No. 2,023,719 discloses another variation being an instrument console mounted above the upper front window of a vehicle extending along the roof and designed to contain illuminated instruments to facilitate ease of reading.

While satisfactory for limited use in truck cabs, neither the particular patents cited or other devices currently being marketed fully meet the needs of the van owner.

Nearly 700,000 vans were sold in 1976 more than double the number sold 5 years earlier. The modern van has become an extensively equipped vehicle. It is in many ways a mini-motor home. It is often extensively customized and equipped with outside air vents, C.B. equipment, stereo tape players and speakers, openable sun-roofs, a clock, mirrors, lights, an alarm system and storage areas.

Nowhere in the prior art is found a molded overhead console adaptable to the vans being sold in todays market. Such a console, disclosed in the present invention, provides a fully molded console that can be mounted in a longitudinal position on the underside of a roof of a van, has extensions down the back two corners and that contains therein means and cutouts for installation of all the various types of equipment currently desired in vans and in addition various trims and decorations to enhance the appearance of the interior of the van.

OBJECTS OF THE INVENTION

With the foregoing in mind it is an object of the present invention to provide inside a van a four-piece molded console of elongated rectangular shape, two parts of which are mounted in a longitudinal position on the underside of the roof of the van with the additional molded parts running vertically from the roof down the two rear corners of the van.

To provide an overhead van console of the type before described which includes mounting positions for integrated door lights and an alarm system.

To provide an overhead van console of the type herein described which contains a cutout for at least one sun roof.

To provide an overhead van console of the character herein described wherein the rear corner part contains mounting positions for stereo speakers.

To also provide an overhead van console of the kind described which is of molded plastic or fiberglass.

To also provide an overhead van console as herein described which has mounting positions for a C.B. radio and an AM/FM Multiplex Stereo with eight-track or cassett tape.

To provide an overhead van console of the type noted with an opening for an air vent.

To provide an overhead van console as described herein the rear overhead portion thereof which is variable in length so as to accomodate the three standard length vans sold in the United States, i.e., 9 feet, 10 feet, and 11 feet wheelbase vans.

To provide an overhead van console of the character aforesaid with positions for the installation of mirrors.

To provide an overhead van console of the type herein described which provides positions on the overhead portion for two additional speakers.

To provide an overhead van console of the type noted that contains mounting positions for control switches and dials of the electronic equipment mounted therein.

To provide an overhead van console of the type noted that utilizes the roof window accessory to securely fasten it to the roof.

Various other more detailed objects and advantages of the invention such as a raise in connection with the carrying out of the above ideas will become apparent and be hereafter stated as the description of the invention proceeds.

SUMMARY OF THE INVENTION

The foregoing objects are achieved by providing an overhead van console which is made of four-molded plastic or fiberglass parts which are shaped to fit along the entire roof of the van and down the rear corners below the window level. The portion of the console which faces the roof of the van contains supporting ribs which are longitudinally and laterally arranged to fit against wood strips mounted longitudinally along the roof of the van and attached to reinforcing beams which are ordinarily present for the purpose of strengthening the van roof. Such supporting ribs on the console also strengthen the structure and prevent deformation when the various accessories are mounted therein. Depending from the rear corners of the roof and extending from the roof downward just below the normal level of the side window bottoms, are two corner pieces designed to cover the rear corners of the van and each to contain a speaker. Trapped between the overhead console and the roof of the van is insulating material to assist in keeping the inside of the van quite cool. The front part extends from just above the front window of the cab to a position just behind the drivers seat. It is separated from the rear part by a rail or track to which a curtain or divider is mounted enabling the front or cab portion of the van to be shut off from the rear of the van. The front part is uniform for all vans while the rear part is formed in three different lengths to correspond with the varying standard lengths of vans sold in the United States. Extending from the front edge of the console and extending rearwardly is a narrow wall into which a digital clock is mounted along with control switches for an AM/FM radio and record player installation. Immediately behind said mounted clock is a large cutout for at least one sun roof installation. The sun roof window assembly traps the edges of the console between it and the roof of the van holding the foreward molded part tightly in place. Depending from the console and extending forwardly is a narrow wall located immediately behind the opening for the sun roof into which can be mounted a C.B. radio. On each side of the area for mounting the C.B. radio descending from the roof console are circular cylindrical areas into coaxial speakers can be mounted. Rearward from each speaker mounting are integrated door lights and an alarm system is mounted by drawing through the console and letting the switches protrude inside the van. An external C.B. speaker is mounted flush with the console surface between said lights and the alarm system. The curtain rail or track separates the forward part of the console from the rear. Rearward of the curtain track extending horizontally across the width of the van roof or the console are three spaced mirrors spaced equally and mounted flush with the surface of the console. The length of these mirrors is dependent on the length of the rear console part which is dependent on the van length. Behind the mirrors is an upwardly depressed area cut-out in the center for mounting one or more rear roof vents with tinted covers. At the rear of the console and depending from and extending rearwardly is a narrow wall into which is mounted double aircraft lights. On each side of the wall mounted flush with the surface thereof are lights to produce a stereo light effect. The rearward side of such depending wall is mounted another aircraft light. Depending from the two corners of the roof and extending down the corners of the van are two structures into each of which is mounted a rear speaker. Trapped between the console and the roof of the van is insulation material which deadens the outside sound and prevents the passage of heat from the roof of the van to the interior thereof. Both front and rear portions of the overhead console between the console and the roof contain horizontal and longitudinal ribs spaced to co-act with wood strips mounted to the reinforcing bars on the interiro of the roof of the van for attachment purposes and to space the console so as to receive the equipment to be mounted thereto and provide space for the fasteners to mount said equipment. For a full and more complete understanding of the invention reference may be had to the following description and accompanying drawings.

DESCRIPTION OF THE DRAWINGS

FIG. 2 is a section view through the line 2—2

FIG. 4 is a section through point 4—4 of the rear portion of a typical sun roof — console-van roof assembly;

FIG. 5 is a cross-section through 5—5 of the front portion of the sun roof console — van roof assembly;

FIG. 6 is a cross-section through 6—6 of one of the speaker mountings in the front portion;

FIG. 7 is a cross-section through a sun roof assembly showing mounting features;

FIG. 8 is an interior plan view of the rear upper part of the console assembly;

FIG. 9 is an interior plan view of a rear corner portion; and

FIG. 10 is a cross-section through 10—10 of a rear corner part.

DESCRIPTION OF THE PREFERRED EMBODIMENT

Figure 1:
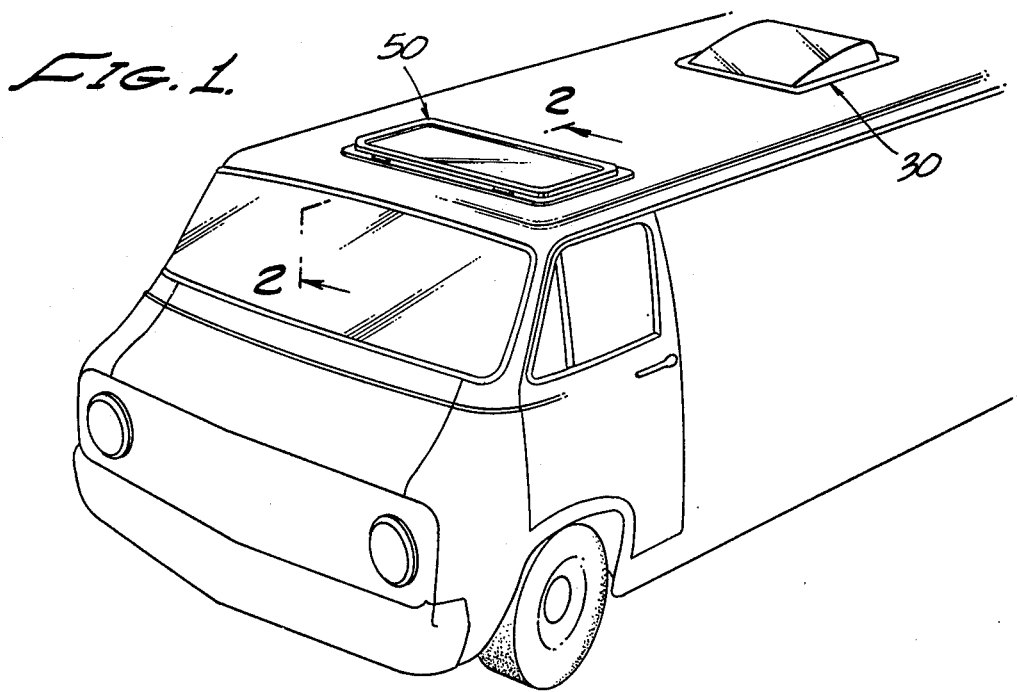
FIG. 1 is a prespective of a van showing the sun roof and rear roof vent in place.

Referring now to the drawings:

FIG. 1 shows a typical van exterior with one sun roof assembly 20 and one rear vent 30 visible through the van roof. This invention also provides for two or more sun roofs spaced across the width of the van roof and two or more vents located along the rear portion of the roof.

Figure 3:
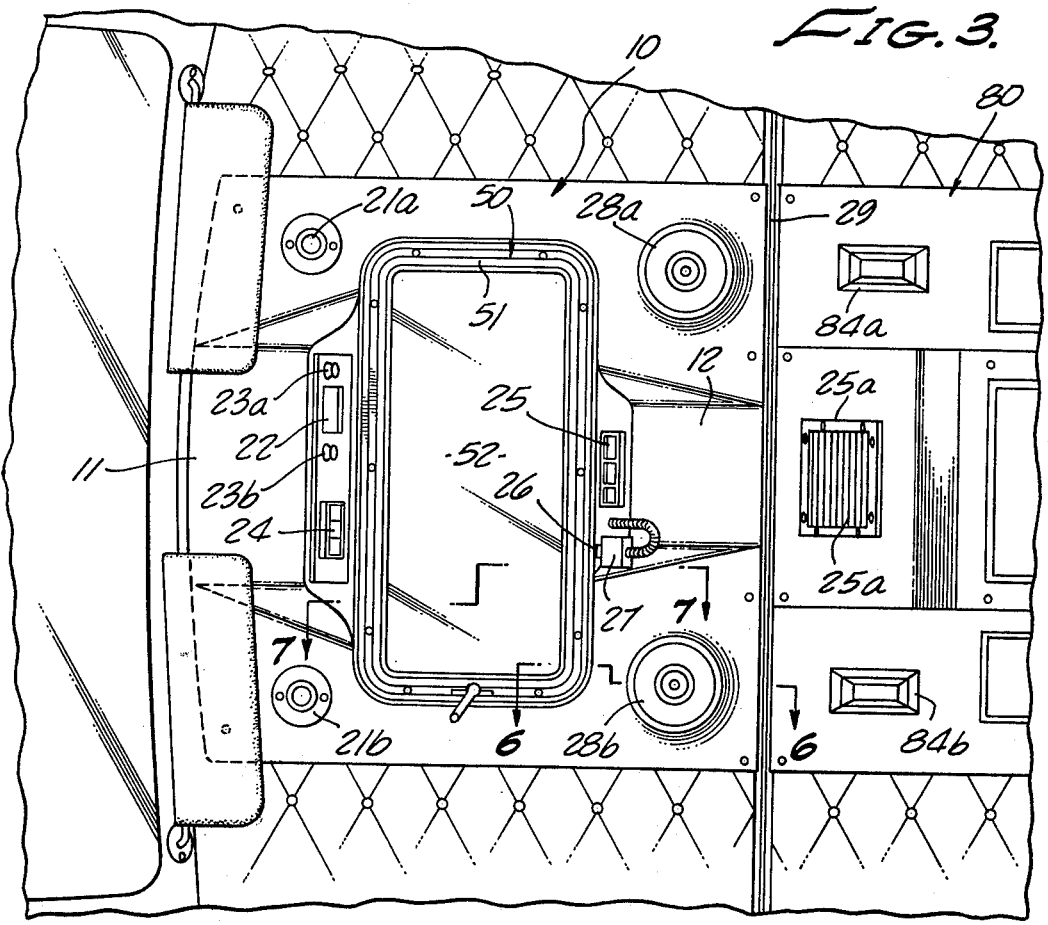
FIG. 3 is an interior plan view of the front upper part of the console.

FIG. 3 is an interior view of the forward overhead molded console 10 of this invention.

Mounted therein is a sunroof 50, single aircraft lights 21a and 21b. Recessed into a first enlarged portion of the console 11 and attached thereto is an AM/FM stereo tape player 22 with control knobs 23a and 23b protruding therefrom a digital clock 24. Behind the sun roof assembly is a second enlarged portion of the console 12 into which C.B. equipment 25 is mounted. An attachment means 26 holds the microphone 27 co-axial speakers 28a and 28b are mounted in recepticles provided in the molded front section. A curtain track 29 on which a curtain (not shown) is hung divides the front cab from the rear portion of the van when desired. It also forms an attachment means to hold the rear edge of the front nolded portion to the cab roof.

FIG. 2 is a cross-section through 2—2 of FIG. 1 showing the contour of the molded console 10 including enlarged portion 11 into which the AM/FM tape-radio accessory 22 is mounted and CB accessory 25 in rear enlarged portion 12 and sun roof assembly 20.

The metal reinforcing bars 41 are welded to the roof 40 of the van.

Insulation batting 42 is cemented to the inner portion of the roof 40 and fits between the metal reinforcing bars and wood strips 60 shown in FIG. 4 which run at right angles to the metal reinforcing bars 41 and are rigidly attached thereto.

FIG. 4 is a cross-section through 4—4 of FIG. 3 Wood spacers 60 which run longitudinally along the roof of the van are attached to the metal supports 41. The console is attached to these wooden spaces at various points by means of screw fasteners not shown.

FIG. 5 is a cross-section through 5—5 of FIG. 2. C.B. accessory 25 is shown installed in enlarged portion 12.

FIG. 6 is a partial cross-section through 6—6 of FIG. 3. It discloses a speaker with connecting wires mounted in molded section 28b.

FIG. 7 is a cross-section through 7—7 of FIG. 3. In this view the unique manner in which the sun roof assembly 50 interacts with the roof 40 of the van and the molded console 10 of this invention to rigidly secure the console the roof of the van. The sum roof assembly 50 is well known in the art and is composed of an outer frame 51, glass 52, molding 53, to hold the glass in place.

An inner frame 54 is an integral part of outer frame 51 and spaces the assembly properly. An inner garnish 55 is attached to the inner frame 54 by fasteners 56. The edge of the inner garnish 55a, traps the edge of molded console 10 placing it in tension between insulation batting 42 and wood strips 60 ridgigly securing the console in place. The sun roof assembly 50 itself secured to the van roof by fasteners 56 which are attached through a portion of the outer frame 51 to the roof 40. The sun roof is opened by means of conventional hinge assembly 57. The rear console 80 FIG. 8 contains recessed portions in which mirror 81a, 81b and 81c are mounted. The length of these mirrors and the recessed portions are varied according to the length of the rear console portion. Thus all the variation in the length to accomodate the variations in body lengths between 9, 10 and 11 foot wheelbase vans is in the area occupied by the mirrors. At least one rear roof vent 82 occupies a rear recessed area. An external speaker 25a for the C.B. accessory is mounted in raised section 83 of rear console 80. Integrated door lights and alarm system 84a and 84b are mounted on each side of raised portion 83. Double aircraft lights 85a and 85b are located on raised portion 86 of the back portion of the rear console assembly. Strobe or stereo light units 87a and 87b are mounted on each side of raised portion 86. The rear console assembly is attached to the interior of the roof of the van by a number of screw fasteners (not shown) which are embedded in the wood strips 60.

FIG. 9 shows the two rear corner assemblies 100a and 100b These are contoured to give a pleasing appearance and to enhance the performance of stereo speakers 101a and 101b which are mounted in raised areas 102a and 102b. The upper portion of the corner assembly is attached to the roof wood strips 60 by fasteners not shown and the bottom portion into the inside metal supports (not shown) of the body of the van. In FIG. 10 which is a cross-section through 10—10 of FIG. 9 one can observe the contoured effect and the manner in which the speakers are mounted in the corner portions of the console.

While four distinct parts have been disclosed in the mode described in the specifications, one or more parts can be molded together without departing from the disclosed invention. It can be seen that many variations of the above features can be made to suit individual customer desires without departing from the concepts disclosed in the description and drawings and encompassed by the claims.

I claim:

1. For installation in the interior of a standard American manufactured van, an elongate molded overhead and rear corners console assembly selectively moldable in three different lengths to fit the three standard lengths of said American manufactured van;

said console assembly having front and rear raised overhead portions thereon to receive electronic accessory means;

a recessed cutout area in said front overhead portion to cooperate with and in which is mounted at least one sun roof assembly means;

a recessed cutout area in said rear overhead portion to contain and cooperate with and in which is mounted at least one rear roof vent means;

variable length recessed areas to contain mirror means in said rear overhead portion thereof;

spaced cutout means in said overhead console assembly in which are mounted light means and alarm means;

symmetrical raised means on each side of said front overhead portion of said console assembly for mounting speaker means;

raised portions in the upper portion of each of said rear corners assembly into which are mounted speaker means;

the edges of said recessed cutout areas of said overhead molded console assembly overlap and interact with said sun roof assembly means to rigidly attach said front overhead portion to the roof of said standard American manufactured van;

a curtain track on which a curtain is hung separating the cab portion of said van from the rear portion of said van said track being mounted transversely across the width of said overhead console assembly;

attachment and spacer means to which said console assembly is secured at a distance from the roof of said van;

fastener means for engaging said console assembly with said attachment and spacer means;

insulation means between said console assembly and said roof of said van;

fastener means for attaching said rear corners assembly portions to the rear corners of said van. of said van.

2. The overhead console of claim 1 in which the console assembly is integrally molded in a plurality of parts.

3. The overhead console assembly of claim 1 in which the console assembly is molded in four parts; a front portion, a variable length rear portion and two rear corner portions.

4. The overhead console assembly of claim 1 wherein in each of the three different lengths of said assembly, the recessed area for the mirror means is the only recessed area which varies in length for each of said three different console lengths.

5. The overhead console assembly of claim 1 which is the proper length to fit the entire interior of the roof of said standard American manufactured van with a wheelbase of 9 feet in length.

6. The overhead console assembly of claim 1 which is the proper length to fit the entire interior of the roof of said standard American manufactured van with a wheelbase 10 feet in length.

7. The overhead console assembly of claim 1 which is the proper length to fit the entire interior roof of said standard American manufactured van with a wheelbase 11 feet in length.

* * * * *